United States Patent [19]

Ito et al.

[11] Patent Number: 5,266,634
[45] Date of Patent: Nov. 30, 1993

[54] RESIN COMPOSITION

[75] Inventors: Akitoshi Ito, Nabari; Yutaka Yoshida, Takatsuki, both of Japan

[73] Assignee: Sumitomo Naugatuck Co., Ltd., Osaka, Japan

[21] Appl. No.: 793,726

[22] Filed: Nov. 20, 1991

[30] Foreign Application Priority Data

Nov. 22, 1990 [JP] Japan .................................. 2-319713
Feb. 4, 1991 [JP] Japan .................................. 3-035568
Jul. 19, 1991 [JP] Japan .................................. 3-204831

[51] Int. Cl.$^5$ ..................... C08L 69/00; C08L 55/02; C08L 51/06
[52] U.S. Cl. ......................................... 525/67; 525/71; 525/133; 525/146; 525/148
[58] Field of Search ..................... 525/67, 71, 133, 148

[56] References Cited

U.S. PATENT DOCUMENTS

| | | | |
|---|---|---|---|
| 3,954,905 | 5/1976 | Margotte | 525/67 |
| 4,444,950 | 4/1984 | Sakano et al. | 525/67 |
| 4,499,237 | 2/1985 | Tacke | 525/67 |

FOREIGN PATENT DOCUMENTS

| | | |
|---|---|---|
| 89042 | 9/1983 | European Pat. Off. |
| 1569448 | 6/1970 | Fed. Rep. of Germany . |
| 174257 | 8/1986 | Japan .................................. 525/148 |
| 268754 | 11/1988 | Japan . |
| 0097550 | 4/1990 | Japan . |
| 1007724 | 10/1965 | United Kingdom . |

OTHER PUBLICATIONS

World Patents Index Latest, Week 8850, Feb. 15, 1989, Abstract of JP-A-63 268 754.
Patent Abstracts of Japan, vol. 8, No. 130, Aug. 16, 1984, Abstract of JP-A-59 041 356.

*Primary Examiner*—David J. Buttner

[57] ABSTRACT

A resin composition containing a mixture of a polycarbonate resin and a rubber-reinforced styrene base resin which is prepared by polymerizing, in the presence of a rubbery polymer, a monomer mixture of an aromatic vinyl monomer, at least one of cyanated vinyl monomers and alkyl esters of unsaturated carboxylic acids and at least one other vinyl monomer; a polyolefin graft polymer which is prepared by polymerizing, in the presence of a crystalline polyolefin, a monomer of an aromatic vinyl monomer and at least one of cyanated vinyl monomers and alkyl esters of unsaturated carboxylic acids; and optionally a terpolymer of an olefin, an unsaturated dicarboxylic anhydride and an alkyl ester of an unsaturated carboxylic acid or an epoxy group-containing olefin copolymer of an unsaturated epoxy compound, an olefin and optionally an ethylenically unsaturated compound, which composition has good coating properties.

21 Claims, 1 Drawing Sheet

RESIN COMPOSITION

BACKGROUND OF THE INVENTION

1. Field of the Invention

The present invention relates to a resin composition. More particularly, the present invention relates to a resin composition which comprises a polycarbonate resin, a rubber-reinforced styrene base resin, a specific polyolefin graft polymer and optionally a specific terpolymer or an epoxy group-containing olefin graft polymer and has good coating properties.

2. Description of the Related Art

A polycarbonate resin has good mechanical and thermal properties and widely used in various fields. However, it has some drawbacks such as high molding temperature, poor flowability and large dependency of impact strength on a thickness of an article. To overcome such drawbacks, it is proposed to compound a rubber-reinforced styrene base resin such as ABS resin to the polycarbonate resin and such composition is used as a material of parts in vehicles or light electrical appliances.

The composition comprising the polycarbonate resin and the rubber-reinforced styrene base resin has still some drawbacks such as poor chemical resistance and bad coating properties.

To improve chemical resistance against gasoline or dioctyl phthalate, it is proposed to add a polyamide resin as a third component to the above composition. Since the polyamide resin has poor compatibility with other resins, a large amount of the polyamide resin cannot be compounded in the composition, so that the improvement of the chemical resistance has a limit.

Since a thinner used for coating has a larger influence than gasoline or dioctyl phthalate, the resin article should be treated with a primer.

SUMMARY OF THE INVENTION

An object of the present invention is to provide a resin composition comprising a polycarbonate resin and a rubber-reinforced styrene base resin, which has not only good chemical resistance but also good coating properties and does not require primer treatment before coating.

According to a first aspect of the present invention, there is provided a resin composition comprising:

100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids.

According to a second aspect of the present invention, there is provided a resin composition comprising:

100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight a mixture of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids and (D) a terpolymer comprising 50 to 98.5% by weight of an olefin, 0.5 to 10% by weight of an unsaturated dicarboxylic anhydride and 1 to 40% by weight of an alkyl ester of an unsaturated carboxylic acid in a weight ratio (C/D) of 5:95 to 95:5.

According to a third aspect of the present invention, there is provided a resin composition comprising:

100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight a mixture of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids and (D') an epoxy group-containing olefin copolymer comprising an unsaturated epoxy compound, an olefin and optionally an ethylenically unsaturated compound in a weight ratio (C/D') of 5:95 to 95:5.

DETAILED DESCRIPTION OF THE INVENTION

Figure 1:
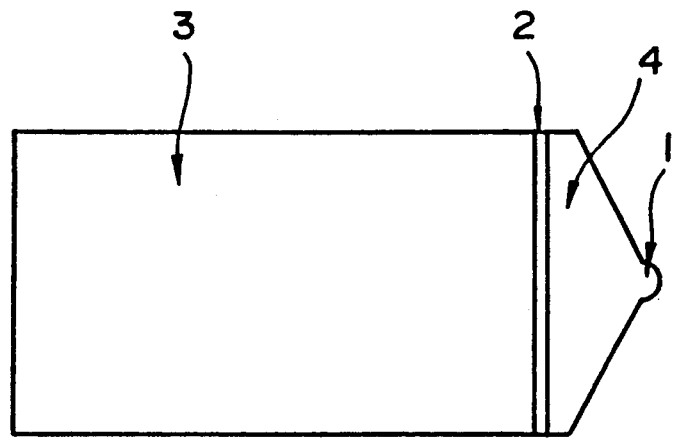

The polycarbonate (A) may be aromatic polycarbonates, aliphatic carbonates and aliphatic aromatic polycarbonates. In general, the polycarbonate is a homo- or copolymer of a bisphenol such as 2,2-bis(4-oxyphenyl)alkanes, bis(4-oxyphenyl)ethers, and bis(4-oxyphenyl)-sulfone, sulfide or sulfoxide. In some cases, it is possible to use a homo- or co-polymer a halogen-substituted bisphenol, or a branched polycarbonate prepared by using a branching modifier.

A molecular weight of the polycarbonate (A) is not critical. Preferably, the polycarbonate (A) has a viscosity average molecular weight of 10,000 to 100,000.

There is no limitation on how to prepare the polycarbonate. Preferably, a phosgene method or a transesterification method is used.

The rubber-reinforced styrene base resin (B) is a resin prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith. Sometimes, the rubber-reinforced styrene base resin (B) contains a polymer of the monomer (b-2) in addition to the graft polymer.

The rubbery polymer (b-1) has a glass transition temperature of not higher than 0° C. and includes diene polymers (e.g. polybutadiene, styrene-butadiene copolymer, acrylonitrile-butadiene copolymer, etc.), ethylene-propylene copolymers (e.g. ethylene-propylene copolymer, ethylenepropylene-non-conjugated diene copolymer, etc.), acrylate copolymer, chlorinated polyethylene and the like. They may be used independently or as a mixture thereof. Among them, the diene polymers are preferred.

The rubbery polymer may be prepared by emulsion polymerization, solution polymerization, suspension polymerization or bulk polymerization. When the emulsion polymerization is employed, a gel content is not limited and preferably from 0 to 95%.

Examples of the aromatic vinyl monomer are styrene, α-methylstyrene, o-, m- or p-methylstyrene, tert.-butylstyrene, α-methylvinyltoluene, dimethylstyrene, chlorostyrene, dichlorostyrene, bromostyrene, dibromostyrene, vinylnaphthalene, and mixtures thereof. Among them, styrene is preferred.

Examples of the cyanated vinyl monomer are acrylonitrile, methacrylonitrile, fumaronitrile, and mixtures thereof. Among them, acrylonitrile is preferred.

Examples of the alkyl ester of unsaturated carboxylic acid are methyl (meth)acrylate, ethyl (meth)acrylate, propyl (meth)acrylate, 2-ethylhexyl (meth)acrylate, and mixtures thereof. Among them, methyl methacrylate is preferred.

Examples of the other vinyl monomer which may constitute the rubber-reinforced styrene base resin (B) are unsaturated carboxylic acids or their anhydrides (e.g. acrylic acid, methacrylic acid, maleic acid, maleic anhydride, citraconic anhydride, etc.), maleimide compounds (e.g. maleimide, methylmaleimide, ethylmaleimide, N-phenylmaleimide, O-chloro-N-phenylmaleimide, etc.), and mixtures thereof.

In the monomer mixture (b-2), amounts of (i) the aromatic vinyl monomer, (ii) the cyanated vinyl monomer or the alkyl ester of unsaturated carboxylic acid and (iii) the other vinyl monomer are (i) 50 to 90% by weight, (ii) 50 to 10% by weight and (iii) 0 to 40% by weight. Outside these ranges, the resin composition has deteriorated heat resistance and processability. Preferably, the amounts are (i) 50 to 80% by weight, (ii) 50 to 20% by weight and (iii) 0 to 30% by weight. In particular, the monomer mixture (b-2) comprising the cyanated vinyl monomer as the monomer (ii) is preferred.

There is no limitation on a ratio of the rubbery polymer (b-1) to the monomers (b-2). In view of heat resistance, impact resistance and processability, a weight ratio of the rubbery polymer (b-1) to the monomers (b-2) is from 5:95 to 80:20.

In particular, the rubber-reinforced styrene base resin (B) preferably comprises the graft polymer having a graft ratio of 20 to 100% and a weight average particle size of 0.05 to 5 μm and the copolymer.

The rubber-reinforced styrene base resin (B) may be prepared by any of conventional polymerization methods such as emulsion polymerization, suspension polymerization, bulk polymerization, solution polymerization or a combination thereof.

The polyolefin graft polymer (C) is a polymer prepared by polymerizing, in the presence of a crystalline polyolefin (c-1), a monomer (c-2) of 50 to 100%, preferably 50 to 90% by weight of an aromatic vinyl monomer and 50 to 0%, preferably 50 to 10 by weight of at least one monomer selected from the group consisting of cyanated vinyl monomers and alkyl esters of unsaturated carboxylic acids.

The crystalline polyolefin (c-1) includes polyethylene and polypropylene. Among them, is preferred crystalline polypropylene having a swelling degree against a mixed monomer of acrylonitrile and styrene in a weight ratio of 25:75 (after one hour at 70° C.) of 2 to 80% by weight, in particular 2 to 60% by weight.

Examples of polyethylene are high density polyethylene, medium density polyethylene, low density polyethylene, linear low density polyethylene, etc., and examples of polypropylene are a homopolymer of propylene and a random or block copolymer of propylene with ethylene or α-olefin. They may be used independently or as a mixture thereof.

An amorphous ethylene-propylene copolymer cannot achieve the objects of the present invention.

As the aromatic vinyl monomer and the cyanated vinyl monomer, the same compounds as exemplified in connection with the rubber-reinforced styrene base resin (B) can be used. As the alkyl ester of unsaturated carboxylic acid, the monomers exemplified in connection with the resin (B) and also glycidyl acrylate or glycidyl methacrylate can be used.

Among them, are preferred styrene as the aromatic vinyl monomer and acrylonitrile as the cyanated vinyl monomer. As the alkyl ester of unsaturated carboxylic acid, glycidyl methacrylate or methyl methacrylate is preferred.

In the monomer mixture (c-2), amounts of (i) the aromatic vinyl monomer and (ii) the cyanated vinyl monomer or the alkyl ester of unsaturated carboxylic acid are (i) 50 to 100% by weight, preferably 50 to 90% by weight and (ii) 50 to 0% by weight, preferably 50 to 10% by weight. Outside these ranges, the composition has deteriorated chemical resistance.

There is no limitation on a ratio of the crystalline polyolefin (c-1) to the monomer (c-2). In view of chemical resistance, coating properties and impact resistance, 20 to 200 parts by weight, preferably 20 to 100 parts by weight of the monomer (c-2) is used per 100 parts by weight of the crystalline polyolefin (c-1).

The polyolefin graft polymer (C) may be prepared by any of conventional polymerization methods such as emulsion polymerization, suspension polymerization, bulk polymerization, solution polymerization or a combination thereof.

The terpolymer (D) in the second aspect of the present invention comprises 50 to 98.5% by weight of the olefin, 0.5 to 10% by weight of the unsaturated dicarboxylic anhydride and 1 to 40% by weight of the alkyl ester of unsaturated carboxylic acid.

Examples of the olefin are ethylene, propylene, butene-1, 4-methylpentene-1, and the like. Among them, ethylene and propylene are preferred.

Examples of the unsaturated dicarboxylic anhydride are maleic anhydride, citraconic anhydride, aconitic anhydride, and the like. Among them, maleic anhydride is preferred.

Examples of the alkyl ester of unsaturated carboxylic acid are methyl (meth)acrylate, ethyl (meth)acrylate, propyl (meth)acrylate, butyl (meth)acrylate, hydroxymethyl (meth)acrylate, and the like. Among them, ethyl acrylate and butyl acrylate are preferred.

When an amount of the olefin in the terpolymer is less than 50% by weight, the composition has insufficient chemical resistance. When this amount exceeds 98.5% by weight, the compatibility among the resins is deteriorated so that the impact resistance of the composition is decreased or the molded article suffers from cleavage.

When an amount of the unsaturated dicarboxylic anhydride is less than 0.5% by weight, the composition has poor impact resistance. When this amount exceeds 10% by weight, heat stability and processability of the composition are deteriorated.

When an amount of the alkyl ester of unsaturated carboxylic acid is less than 1% by weight, the compatibility among the resins is deteriorated. When this amount exceeds 40% by weight, the composition has insufficient chemical resistance and further heat resistance and stiffness of the composition are deteriorated so that balance among the mechanical properties is decreased.

In particular, in view of chemical resistance and impact resistance, the terpolymer preferably comprises 55 to 96% by weight of the olefin, 1 to 8% by weight of the unsaturated dicarboxylic anhydride and 3 to 37% by weight of the alkyl ester of unsaturated carboxylic acid.

The terpolymer (D) may be prepared by any of conventional methods. For example, using a cylindrical autoclave equipped with a blade type agitator, the olefin is charged in a first band of the autoclave, a mixture of the olefin, the unsaturated dicarboxylic anhydride and the alkyl ester of unsaturated carboxylic acid is charged in a second band of the autoclave and further a radical polymerization initiator (e.g. tert.-butyl-2-ethyl perhexanoate dissolved in a hydrocarbon is charged in a third band of the autoclave. Then, the polymerization is initiated by pressurizing the autoclave to 1000 to 2000 atm.

The epoxy group-containing olefin copolymer (D') in the third aspect of the present invention is a copolymer of the unsaturated epoxy compound, the olefin and optionally the ethylenically unsaturated compound. There is no limitation on a composition of the copolymer (D'). Preferably, an amount of the unsaturated epoxy compound is from 0.05 to 95 % by weight.

The unsaturated epoxy compound is a compound having an unsaturated group which can be copolymerizable with the olefin or the ethylencially unsaturated compound and an epoxy group in a molecule.

Examples of the unsaturated epoxy compound are an unsaturated glycidyl ester of the formula:

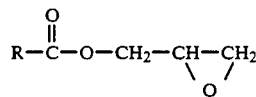
(I)

wherein R is a $C_2$–$C_{18}$ hydrocarbon group having an ethylenically unsaturated bond;
an unsaturated glycidyl ether of the formula:

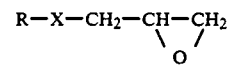
(II)

wherein R is the same as defined above and X is a group of the formula:

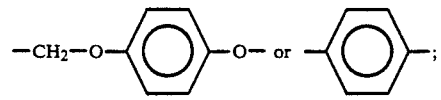

an epoxy alkene of the formula:

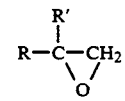
(III)

wherein R is the same as defined above and R' is a hydrogen atom or a methyl group; and p-glycidylstyrene; and the like.

Specific examples of the unsaturated epoxy compound are glycidyl acrylate, glycidyl methacrylate, glycidyl itaconates, butene carboxylates, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monoxide, p-glycidylstyrene and the like. They may be used independently or as a mixture. Among them, glycidyl acrylate and glycidyl methacrylate are preferred.

Examples of the olefin are ethylene, propylene butene, pentene, and the-like. They may be used independently or as a mixture. Among them, ethylene and propylene are preferred.

Examples of the ethylencially unsaturated compound are a vinyl ester of a $C_2$–$C_6$ saturated carboxylic acid, an ester of acrylic acid, methacrylic acid or maleic acid with a saturated $C_1$–$C_8$ alcohol, halogenated vinyl, and the like.

The ethylenically unsaturated compound is used in an amount of 50% or less, preferably from 0.1 to 45% weight based on the whole weight of the copolymer (D').

The epoxy group-containing copolymer (D') may be prepared by copolymerizing the unsaturated epoxy compound, the olefin and optionally the ethylenically unsaturated compound, or graft polymerizing the unsaturated epoxy compound in the presence of a polymer of the olefin or a copolymer of the olefin and the ethylenically unsaturated compound.

Preferred examples of the epoxy group-containing olefin copolymer (D') are ethylene-glycidyl methacrylate copolymer, ethylene-vinyl acetate-glycidyl methacrylate copolymer, ethylene-methyl methacrylate-glycidyl methacrylate copolymer, and a graft polymer prepared by grafting glycidyl methacrylate to an olefin polymer (e.g. polyethylene, polypropylene, poly-1-butene, poly-4-methylpentene-1,ethylene-propylene copolymer, ethylene-propylene-diene copolymer, etc.).

The epoxy group-containing olefin copolymer (D') may be prepared by any of conventional polymerization methods such as emulsion polymerization, suspension polymerization, bulk polymerization, solution polymerization and a combination thereof.

The resin composition of the first aspect of the present invention comprises 100 parts by weight of the resin mixture consisting of 10 to 90% by weight of the polycarbonate resin (A) and 90 to 10% by weight of the rubber-reinforced styrene base resin (B), and 0.1 to 40 parts by weight of the polyolefin graft polymer (C).

The resin composition of the second aspect of the present invention comprises 100 parts by weight of the resin mixture consisting of 10 to 90% by weight of the polycarbonate resin (A) and 90 to 10% by weight of the rubber-reinforced styrene base resin (B), and 0.1 to 40 parts by weight of the polyolefin graft polymer (C) and the terpolymer (D), and the weight ratio of the graft polymer (C) to the terpolymer (D) is from 5:95 to 95:5.

The resin composition of the third aspect of the present invention comprises 100 parts by weight of the resin mixture consisting of 10 to 90% by weight of the polycarbonate resin (A) and 90 to 10% by weight of the rubber-reinforced styrene base resin (B), and 0.1 to 40 parts by weight of the polyolefin graft polymer (C) and the epoxy group-containing olefin copolymer (D'), and the weight ratio of the graft polymer (C) to the epoxy group-containing copolymer (D') is from 5:95 to 95:5.

When the amount of the polycarbonate resin (A) is less than 10% by weight based on the total weight of the resin (A) and the resin (B), the composition has insufficient heat resistance and impact resistance. When this amount exceeds 90% by weight, the composition has insufficient impact resistance. Preferably, the resin mixture consists of 20 to 80% by weight of the polycarbonate resin (A) and 80 to 20% by weight of the rubber-reinforced styrene base resin (B).

When the amount of the polyolefin graft polymer (C) or the total amount of the polyolefin graft copolymer (C) and the terpolymer (D) or the epoxy group-containing olefin polymer (D') is less than 0.1 parts by weight per 100 parts of the total amount of the resins (A) and (B), the final composition has insufficient chemical resistance and coating properties. When this amount exceeds 40 parts by weight, the molded article tends to suffer from cleavage. In view of the balance among the mechanical properties, the amount of the polyolefin graft polymer (C), or the total amount of the polyolefin graft copolymer (C) and the terpolymer (D) or the epoxy group-containing olefin polymer (D') is from 0.1 to 30 parts by weight.

When the weight ratio of the polyolefin graft copolymer (C) to the terpolymer (D) or the epoxy group-containing olefin copolymer (D') is outside the above range, the balance between the chemical resistance and the coating properties is not satisfactory. In particular, this weight ratio is from 10:90 to 90:10.

There is not limitation on a sequence of mixing the components (A), (B), (C) and (D) or (D') and a state of each component. The components in the form of pellets, beads or powder may be simultaneously mixed, or two or more of them are premixed and then the reminder component(s) are mixed with the premix. The mixing can be carried out by any of conventional mixing means such as a Banbury mixer, rolls or an extruder.

If necessary, any of conventional additives, reinforcing materials and/or fillers such as an antioxidant, a UV light absorber, a light stabilizer, an antistatic agent, a lubricant, a dye, a pigment, a plasticizer, a flame retardant, a mold release agent, glass fibers, metal fibers, carbon fibers and metal flakes may be compounded in the resin composition of the present invention. In addition, to the resin composition of the present invention, a thermoplastic resin such as polyamide, polyacetal, polyester, polyphenylene oxide, polymethyl methacrylate or polyvinyl chloride may be added.

PREFERRED EMBODIMENTS OF THE INVENTION

The present invention will be illustrated by the following Examples, in which "parts" and "%" are by weight unless otherwise indicated.

Resins used in Examples are as follows:

Polycarbonate (A)

PC: An aromatic polycarbonate having a viscosity average molecular weight of 25,000 which is prepared from 2,2-bis(4-hydroxyphenyl)propane and phosgene.

Rubber-reinforced styrene base resin (B)

ABS-1: A polybutadiene rubber latex (a particle size of 0.45 μm and a gel content of 83%) (30 parts in terms of a solid content), styrene (50 parts) and acrylonitrile (20 parts) are emulsion polymerized by a conventional manner, salted out, dehydrated and dried to obtain a resin having a graft ratio of 73% and a rubber content of 30%.

ABS-2: A polybutadiene rubber latex (a particle size of 0.35 μm and a gel content of 90%) (50 parts in terms of a solid content), styrene (35 parts) and acrylonitrile (15 parts) are emulsion polymerized by a conventional manner.

Separately, styrene (55 parts), acrylonitrile (30 parts) and N-phenylmaleimide (15 parts) are emulsion polymerized in a conventional manner.

Then, the resulting polymer latexes are mixed, salted out, dehydrate and dried to obtain a resin which contains the graft polymer having a graft ratio of 55% and has a rubber content of 30%.

Polyolefin graft polymer (C)

C-1: Polyethylene (high pressure polyethylene, density: 0.918 g/cm$^3$, melt flow index 7 g/10 min., swelling degree: 23%) (100 parts), styrene (30 parts) and acrylonitrile (15 parts) are suspension polymerized by a conventional manner, dehydrated and dried to obtain a graft polymer.

C-2: Polypropylene (density: 0.89 g/cm$^3$, melt flow index 1.2 g/10 min., swelling degree: 27%) (100 parts), styrene (40 parts) and acrylonitrile (15 parts) are suspension polymerized by a conventional manner, dehydrated and dried to obtain a graft polymer.

C-3: Ethylene-propylene-diene rubber (iodine value: 24, swelling degree: more than 100%) (100 parts), styrene (40 parts) and acrylonitrile (15 parts) are suspension polymerized by a conventional manner, dehydrated and dried to obtain a graft polymer.

C-4: Polypropylene (density: 0.89 g/cm$^3$, melt flow index 1.2 g/10 min., swelling degree: 27%) (100 parts), styrene (40 parts), acrylonitrile (15 parts) and glycidyl methacrylate (10 parts) are suspension polymerized by a conventional manner, dehydrated and dried to obtain a graft polymer.

Polyamide

PA: 6-Nylon

Terpolymer

D-1 and D-2: Ethylene-maleic anhydride-ethyl acrylate terpolymer

Using a cylindrical autoclave equipped with a blade type agitator, in the presence of tert.-butyl-2-ethyl perhexanoate dissolved in a hydrocarbon, monomers are polymerized at 185° C. under 1600 atm to obtain a terpolymer D-1 consisting of 60% of ethylene, 4.5% of maleic anhydride and 35.5% of ethyl acrylate or a terpolymer D-2 consisting of 92% of ethylene, 1.5% of maleic anhydride and 6.5% of ethyl acrylate.

D-3: Ethylene-maleic anhydride-butyl acrylate terpolymer

In the same manner as in the preparation of the terpolymer D-1 or D-2, a terpolymer D-3 consisting of 70% of ethylene, 4% of maleic anhydride and 26% of butyl acrylate is prepared.

Examples 1-17 and Comparative Examples 1-15

The polycarbonate resin, the rubber-reinforced styrene base resin, the polyolefin graft polymer, the terpolymer, polypropylene and polyamide were mixed in a composition shown in Tables 1, 2 and 3, melt compounded with a twin-screw extruder having a diameter of 40 mm and pelletized.

The properties of each composition are measured by the following methods and the results are summarized in Tables 1, 2 and 3:

Chemical Resistance

Figure 2:
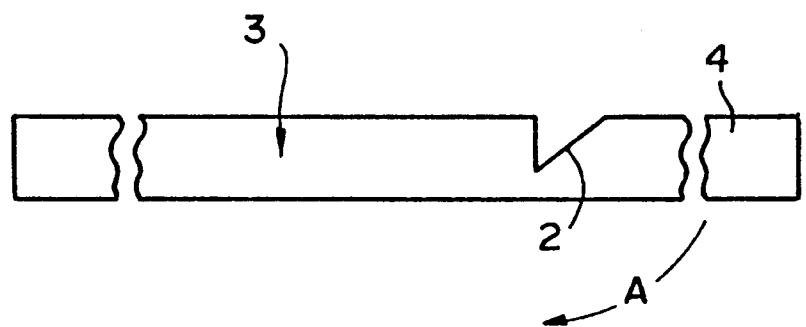

An injection molded ASTM I-type dumbbel sample (a thickness of 1.8 inch and a whole length of 217 mm) is fixed to an arc-shape jig having clamping means at both ends. According to a curvature of the jig, a surface strain of the sample is adjusted to 1% or 1.5%. On a sample surface, kerosine is applied and the sample is kept standing at 60° C. for 24 hours. Thereafter, breakage of the sample or presence of cracks on the sample surface is observed and evaluated according to the following criteria:
O: No crack
Δ: Cracked
X: Broken Coating Property An injection molded ASTM I-type dumbbel sample (a thickness of 1.8 inch and a whole length of 217 mm) is fixed to an arc-shape jig having clamping means at both ends. The sample surface is coated and kept standing at 80° C. for 30 minutes. Thereafter, presence of cracks on the surface is observed and evaluated according to the following criteria:
O: No crack
Δ: Microcracks
X: Cracked Cleavage A test sample having a shape and sizes shown in FIGS. 1 and 2 is bent at a film gate part. Presence of cleavage in a molded part 3 is observed after the sample is bent along a film gate part 2 in a direction of the arrow A and a sprue part 4 is removed. In FIGS. 1 and 2, the reference numeral 1 stands for a gate.
X: No,
O: Yes Impact Resistance Notched Izod impact strength with a sample having a thickness of ¼ inch is measured according to ASTM D-256 at 23° C.

TABLE 1

| | Example No. | | | | | | | |
|---|---|---|---|---|---|---|---|---|
| | C1 | C2 | C3 | 1 | C4 | 2 | 3 | 4 |
| Composition*: | | | | | | | | |
| PC (%) | 40 | 40 | 40 | 40 | 50 | 50 | 50 | 50 |
| ABS-1 (%) | 60 | 60 | 60 | 60 | — | — | — | — |
| ABS-2 (%) | — | — | — | — | 50 | 50 | 50 | 50 |
| C-1 (parts) | — | — | — | 3 | — | 2 | 5 | 10 |
| C-2 (parts) | — | — | — | — | — | — | — | — |
| Polypropylene (parts) | — | 3 | — | — | — | — | — | — |
| PA (parts) | — | — | 3 | — | 5 | — | — | — |
| Properties: | | | | | | | | |
| Chemical resistance (surface strain 1%) | X | Δ | Δ | O | O | O | O | O |
| Coating property (surface strain 1%) | X | Δ | X | O | O | O | O | O |
| Impact resistance (kg · cm/cm) | 42 | 36 | 37 | 41 | 33 | 47 | 46 | 45 |
| Cleavage | X | O | X | X | O | X | X | X |

Note: *"%" values are based on the total weight of PC and ABS.
"Parts" values are based on 100 parts of the total amount of PC and ABS.

TABLE 2

| | Example No. | | | | | | |
|---|---|---|---|---|---|---|---|
| | C5 | C6 | 5 | 6 | 7 | C7 | C8 |
| Composition: | | | | | | | |
| PC (%) | 60 | 60 | 60 | 60 | 60 | 60 | 60 |
| ABS-1 (%) | 40 | 40 | 40 | 40 | 40 | 40 | 40 |
| ABS-2 (%) | — | — | — | — | — | — | — |
| C-1 (parts) | — | — | — | — | 30 | 45 | — |
| C-2 (parts) | — | — | 5 | 10 | — | — | — |
| C-3 (parts) | — | — | — | — | — | — | 5 |
| Polypropylene (parts) | 5 | — | — | — | — | — | — |
| PA (parts) | — | 5 | — | — | — | — | — |
| Properties: | | | | | | | |
| Chemical resistance (surface strain 1%) | O | O | O | O | O | O | Δ |
| Coating property (surface strain 1%) | O | O | O | O | O | O | Δ |
| Impact resistance (kg · cm/cm) | 32 | 34 | 40 | 38 | 36 | 34 | 45 |
| Cleavage | O | O | X | X | X | O | O |

TABLE 3

| | Example No. | | | | | | | | | | | | | | | |
|---|---|---|---|---|---|---|---|---|---|---|---|---|---|---|---|---|
| | 8 | 9 | 10 | C10 | C11 | C12 | 11 | 12 | 13 | 14 | 15 | 16 | 17 | C13 | C14 | C15 |
| Composition: | | | | | | | | | | | | | | | | |
| PC (%) | 60 | 60 | 60 | 60 | 60 | 60 | 40 | 40 | 50 | 50 | 50 | 50 | 50 | 40 | 50 | 50 |
| ABS-1 (%) | 40 | — | 40 | 40 | 40 | 40 | 60 | — | — | 50 | 50 | 50 | 50 | — | 50 | 50 |
| ABS-2 (%) | — | 40 | — | — | — | — | — | 60 | 50 | — | — | — | — | 60 | — | — |
| C-1 (parts) | 2 | — | 3 | — | — | — | — | 2 | — | — | — | 25 | — | 0.2 | 30 | — |
| C-2 (parts) | — | 3 | — | — | — | — | 0.5 | — | 5 | 10 | 2 | — | — | — | — | 10 |
| C-4 (parts) | — | — | — | — | — | — | — | — | — | — | — | — | 5 | — | — | — |
| D-1 (parts) | 3 | — | — | 3 | — | — | — | 5 | 2 | — | — | 5 | 5 | 5 | 15 | — |
| D-2 (parts) | — | 2 | — | — | — | — | 1.5 | — | — | 2 | — | — | — | — | — | 0.5 |
| D-3 (parts) | — | — | 5 | — | — | — | — | — | — | — | 20 | — | — | — | — | — |
| Polypropylene (parts) | — | — | — | — | 5 | — | — | — | — | — | — | — | — | — | — | — |

TABLE 3-continued

| | Example No. | | | | | | | | | | | | | | | |
|---|---|---|---|---|---|---|---|---|---|---|---|---|---|---|---|---|
| | 8 | 9 | 10 | C10 | C11 | C12 | 11 | 12 | 13 | 14 | 15 | 16 | 17 | C13 | C14 | C15 |
| PA (parts) | — | — | — | — | — | 5 | — | — | — | — | — | — | — | — | — | — |
| Properties: | | | | | | | | | | | | | | | | |
| Chemical resistance | | | | | | | | | | | | | | | | |
| Surface strain 1% | ○ | ○ | ○ | ○ | ○ | ○ | ○ | ○ | ○ | ○ | ○ | ○ | ○ | ○ | ○ | ○ |
| Surface strain 1.5% | ○ | ○ | ○ | △ | △ | △ | ○ | ○ | ○ | ○ | ○ | ○ | ○ | △ | ○ | △ |
| Coating property | | | | | | | | | | | | | | | | |
| Surface strain 1% | ○ | ○ | ○ | ○ | ○ | ○ | ○ | ○ | ○ | ○ | ○ | ○ | ○ | ○ | ○ | ○ |
| Surface strain 1.5% | ○ | ○ | ○ | △ | X | △ | ○ | ○ | ○ | ○ | ○ | ○ | ○ | △ | ○ | △ |
| Impact resistance (kg · cm/cm) | 41 | 39 | 40 | 42 | 32 | 34 | 43 | 40 | 40 | 38 | 38 | 37 | 38 | 41 | 35 | 38 |
| Cleavage | X | X | X | X | ○ | ○ | X | X | X | X | X | X | X | X | ○ | X |

EXAMPLES 18-23 AND COMPARATIVE EXAMPLES 16-19

According to the polymerization conditions for high pressure polyethylene using an autoclave type polyethylene producing apparatus, the following epoxy group-containing olefin copolymer D'-1 or D'-2 is prepared by bulk polymerization.

D'-1: Ethylene-glycidyl methacrylate-vinyl acetate copolymer (weight ratio: 90:7:3)

D'-2: Ethylene-glycidyl methacrylate copolymer (weight ratio: 90:10)

The polycarbonate resin, the rubber-reinforced styrene base resin, the polyolefin graft polymer and the epoxy group-containing olefin copolymer were mixed in a composition shown in Table 4, melt compounded with a twin-screw extruder having a diameter of 40 mm and pelletized.

The properties were measured in the same manner as in the above Examples. The results are shown in Table 4.

TABLE 4

| | Example No. | | | | | | | | | |
|---|---|---|---|---|---|---|---|---|---|---|
| | 18 | 19 | 20 | 21 | 22 | 23 | C16 | C17 | C18 | C19 |
| Composition: | | | | | | | | | | |
| PC (%) | 60 | 60 | 40 | 40 | 50 | 50 | 60 | 40 | 50 | 50 |
| ABS-1 (%) | 40 | — | 60 | — | 50 | 50 | 40 | — | 50 | 50 |
| ABS-2 (%) | — | 40 | — | 60 | — | — | — | 60 | — | — |
| C-1 (parts) | 2 | — | — | 2 | 20 | — | — | 0.2 | 30 | — |
| C-2 (parts) | — | 3 | 0.5 | — | — | — | — | — | — | 10 |
| C-4 (parts) | — | — | — | — | — | 5 | — | — | — | — |
| D'-1 (parts) | 4 | — | — | 6 | 5 | 5 | 4 | 7 | 15 | — |
| D'-2 (parts) | — | 6 | 2 | — | — | — | — | — | — | 0.5 |
| Properties: | | | | | | | | | | |
| Chemical resistance | | | | | | | | | | |
| Surface strain 1% | ○ | ○ | ○ | ○ | ○ | ○ | △ | ○ | ○ | ○ |
| Surface strain 1.5% | ○ | ○ | ○ | ○ | ○ | ○ | △ | △ | ○ | △ |
| Coating property | | | | | | | | | | |
| Surface strain 1% | ○ | ○ | ○ | ○ | ○ | ○ | ○ | ○ | ○ | ○ |
| Surface strain 1.5% | ○ | ○ | ○ | ○ | ○ | ○ | △ | △ | ○ | △ |
| Impact resistance (kg · cm/cm) | 38 | 39 | 42 | 37 | 38 | 39 | 40 | 40 | 34 | 38 |
| Cleavage | X | X | X | X | X | X | X | ○ | X | X |

What is claimed is:

1. A resin composition comprising:
100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids.

2. The resin composition according to claim 1, wherein said polycarbonate (A) comprises at least one bisphenol.

3. The resin composition according to claim 1, wherein said rubbery polymer (b-1) is a diene polymer.

4. The resin composition according to claim 1, wherein said aromatic vinyl monomer of (b-2) is styrene and wherein said aromatic vinyl monomer of (c-2) is styrene.

5. The resin composition according to claim 1, wherein said cyanated vinyl monomer of (b-2) is acrylonitrile and wherein said cyanated vinyl monomer of (c-2) is acrylonitrile.

6. The resin composition according to claim 1, wherein said alkyl ester of unsaturated carboxylic acid of (b-2) is methyl methacrylate and wherein said alkyl ester of unsaturated carboxylic acid of (c-2) is methyl methacrylate.

7. The resin composition according to claim 1, wherein said crystalline polyolefin (c-1) is polyethylene or polypropylene.

8. A resin composition comprising:

100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight a mixture of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids and (D) a terpolymer comprising 50 to 98.5% by weight of an olefin, 0.5 to 10% by weight of an unsaturated dicarboxylic anhydride and 1 to 40% by weight of an alkyl ester of an unsaturated carboxylic acid in a weight ratio (C/D) of 5:95 to 95:5.

9. The resin composition according to claim 8, wherein said polycarbonate (A) comprises at least one bisphenol.

10. The resin composition according to claim 8, wherein said rubbery polymer (b-1) is a diene polymer.

11. The resin composition according to claim 8, wherein said aromatic vinyl monomer of (b-2) is styrene and wherein said aromatic vinyl monomer of (c-2) is styrene.

12. The resin composition according to claim 8, wherein said cyanated vinyl monomer of (b-2) is acrylonitrile and wherein said cyanated vinyl monomer of (c-2) is acrylonitrile.

13. The resin composition according to claim 8, wherein said alkyl ester of unsaturated carboxylic acid of (b-2) is methyl methacrylate and wherein said alkyl ester of unsaturated carboxylic acid of (c-2) is methyl methacryalte.

14. The resin composition according to claim 8, wherein said crystalline polyolefin (c-1) is polyethylene or polypropylene.

15. A resin composition comprising:

100 parts by weight of a mixture consisting of (A) 10 to 90% by weight of a polycarbonate resin and (B) 90 to 10% by weight of a rubber-reinforced styrene base resin which is prepared by polymerizing, in the presence of a rubbery polymer (b-1), a monomer (b-2) of 50 to 90% by weight of an aromatic vinyl monomer, 50 to 10% by weight of at least one monomer selected from the group consisting of cyanated vinyl monomers and alkyl esters of unsaturated carboxylic acids and 0 to 40% by weight of at least one other vinyl monomer which is copolymerizable therewith, and 0.1 to 40 parts by weight a mixture of (C) a polyolefin graft polymer which is prepared by polymerizing, in the presence of a crystalline polyolefin (c-1), a monomer (c-2) of 50 to 100% by weight of an aromatic vinyl monomer and 50 to 0% by weight of at least one monomer selected from the group consisting of cyanated vinyl monomers and alkyl esters of unsaturated carboxylic acids and (D') an epoxy group-containing olefin copolymer comprising an unsaturated epoxy compound, an olefin and optionally an ethylenically unsaturated compound in a weight ratio (C/D') of 5:95 to 95:5.

16. The resin composition according to claim 15, wherein said polycarbonate (A) comprises at least one bisphenol.

17. The resin composition according to claim 15, wherein said rubbery polymer (b-1) is a diene polymer.

18. The resin composition according to claim 15, wherein said aromatic vinyl monomer of (b-2) is styrene and wherein said aromatic vinyl monomer of (c-2) is styrene.

19. The resin composition according to claim 15, wherein said cyanated vinyl monomer of (b-2) is acrylonitrile and wherein said cyanated vinyl monomer of (c-2) is acrylonitrile.

20. The resin composition according to claim 15, wherein said alkyl ester of unsaturated carboxylic acid of (b-2) is methyl methacrylate and wherein said alkyl ester of unsaturated carboxylic acid of (c-2) is methyl methacrylate.

21. The resin composition according to claim 15, wherein said crystalline polyolefin (c-1) is polyethylene or polypropylene.

* * * * *

UNITED STATES PATENT AND TRADEMARK OFFICE
CERTIFICATE OF CORRECTION

PATENT NO. : 5,266,634

DATED : November 30, 1993

INVENTOR(S) : AKITOSHI ITO ET AL

It is certified that error appears in the above-identified patent and that said Letters Patent is hereby corrected as shown below:

Item [73],

On the cover page, adjacent "Assignee", change "Sumitomo Naugatuck Co., Ltd." to -- SUMITOMO DOW LIMITED --.

Signed and Sealed this

Fifth Day of April, 1994

Attest:

BRUCE LEHMAN

Attesting Officer

Commissioner of Patents and Trademarks